(12) United States Patent
Jeong et al.

(10) Patent No.: US 10,019,349 B2
(45) Date of Patent: Jul. 10, 2018

(54) CACHE MEMORY AND METHOD OF MANAGING THE SAME

(71) Applicant: Samsung Electronics Co., Ltd., Suwon-si (KR)

(72) Inventors: Seong Hoon Jeong, Yongin-si (KR); Woong Seo, Hwaseong-si (KR); Sang Heon Lee, Hwaseong-si (KR); Sun Min Kwon, Seoul (KR); Ho Young Kim, Seoul (KR); Hee Jun Shim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 370 days.

(21) Appl. No.: 14/715,683

(22) Filed: May 19, 2015

(65) Prior Publication Data

US 2016/0124866 A1 May 5, 2016

(30) Foreign Application Priority Data

Oct. 31, 2014 (KR) ........................ 10-2014-0150624

(51) Int. Cl.
*G06F 12/00* (2006.01)
*G06F 12/02* (2006.01)
*G06F 12/06* (2006.01)
*G06F 12/0846* (2016.01)

(52) U.S. Cl.
CPC ...... *G06F 12/0207* (2013.01); *G06F 12/0607* (2013.01); *G06F 12/0846* (2013.01); *G06F 2212/1016* (2013.01); *G06F 2212/1056* (2013.01); *G06F 2212/455* (2013.01)

(58) Field of Classification Search
CPC ............ G06F 12/0207; G06F 12/0607; G06F 12/0846; G06F 2212/1016; G06F 2212/1056; G06F 2212/455
See application file for complete search history.

(56) References Cited

U.S. PATENT DOCUMENTS

| 6,289,413 | B1 | 9/2001 | Rogers et al. | |
|---|---|---|---|---|
| 7,580,042 | B2 | 8/2009 | Chung et al. | |
| 2003/0122837 | A1* | 7/2003 | Saxena | G09G 5/39 345/566 |
| 2006/0047890 | A1* | 3/2006 | Van De Waerdt | G06F 12/0207 711/105 |

(Continued)

FOREIGN PATENT DOCUMENTS

| KR | 10-2002-0084723 A | 11/2002 |
|---|---|---|
| KR | 10-0648293 B1 | 11/2006 |
| KR | 10-0654462 B1 | 11/2006 |

*Primary Examiner* — Zhuo Li
(74) *Attorney, Agent, or Firm* — Harness, Dickey & Pierce, P.L.C.

(57) ABSTRACT

A cache memory and a method of managing the same are provided. The method of managing a cache memory includes determining whether a number of bits of a data bandwidth stored in a bank is an integer multiple of a number of bits of unit data in data to be stored, storing first unit data, among the data to be stored, in a first region of a first address in the bank in response to the number of bits of the data bandwidth not being the integer multiple of the number of bits of the unit data, and storing part of second unit data, among the data to be stored, in a second region of the first address.

16 Claims, 8 Drawing Sheets

(56) References Cited

U.S. PATENT DOCUMENTS

2010/0328330 A1* 12/2010 Watanabe ........... G06F 12/0292
345/531
2015/0089168 A1* 3/2015 Kalyanasundharam
.......................... G06F 12/0607
711/157

* cited by examiner

FIG. 8B

CACHE MEMORY AND METHOD OF MANAGING THE SAME

CROSS-REFERENCE TO RELATED APPLICATION

This application claims the benefit under 35 USC 119(a) of Korean Patent Application No. 10-2014-0150624, filed on Oct. 31, 2014, in the Korean Intellectual Property Office, the disclosure of which is incorporated herein by reference for all purposes.

BACKGROUND

1. Field

The following description relates to cache memories and methods of managing the same.

2. Description of Related Art

Recently, graphic systems have been enabled to express more realistic graphic images on personal computers, home video game computers, or portable devices. Such a graphic system performs many processes to render or draw graphic primitives on a screen.

In graphic processing on a high-resolution monitor, as the high-resolution monitor has more pixels than common monitors, it is necessary to increase a processing speed of a rendering engine that performs rendering. Such speed requirement may be satisfied by improving an internal configuration of a graphic processor or by increasing the number of rendering engines to perform parallel processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are cache memories having increased storage efficiency and reading efficiency, and methods of managing the same.

Additional aspects will be set forth in part in the description which follows and, in part, will be apparent from the description, or may be learned by practice of the presented embodiments.

According to an aspect of an embodiment, a method of managing a cache memory includes determining whether number of bits of a data bandwidth stored in a bank is an integer multiple of number of bits of unit data in data to be stored, storing first unit data, among the data to be stored, in a first region of a first address in the bank in response to the number of bits of the data bandwidth not being the integer multiple of the number of bits of the unit data, and storing part of second unit data, among the data to be stored, in a second region of the first address.

The method may further include storing remaining second unit data at a second address different from the first address.

The remaining second unit data stored at the second address may be stored in a same bank as the first unit data stored at the first address and the second address may be different from the first address in either a column address or a row address.

The remaining second unit data stored at the second address may be stored in a bank different from the bank where the first unit data having the first address is stored.

The remaining second unit data stored at the second address may have a same row address as the bank different from the bank where the first address is stored.

When the remaining second unit data includes cells, the cells may be respectively stored at different addresses or in different banks.

The data to be stored may be at least one selected from among texture data, pixel data, and sensitivity data.

The number of bits of the unit data may be $3 \times 2^n$ (where n is a natural number) and the number of bits of the data bandwidth may be $2^m$ (where in is a natural number).

The first unit data and the second unit data may have different mipmap levels.

A mipmap level of the first unit data may be lower than a mipmap level of the second unit data.

The method may further include sequentially storing the data to be stored in the bank on a unit data basis in response to the number of bits of the data bandwidth being the integer multiple of the number of bits of the unit data.

According to an aspect of another exemplary embodiment, a cache memory includes a bank, and a cache controller configured to store data read from a main memory in the bank, wherein, in response to a number of bits of a data bandwidth in the bank not being an integer multiple of number of bits of unit data in the read data, the cache controller stores first unit data, among the read data, in a first region of a first address stored in the bank and stores part of second unit data, among the read data, in a second region at the first address.

The cache controller ma store remaining second unit data at a second address different from the first address.

The remaining second unit data stored at the second address may be stored in a same bank as the first unit data stored at the first address and the second address may be different from the first address in either a column address or a row address.

The remaining second unit data stored at the second address may be stored in a bank different from the bank where the first unit data having the first address is stored.

The remaining second unit data stored at the second address may have a same row address as the bank different from the bank where the first address is stored.

When the remaining second unit data includes cells, the cache controller may store the cells at different addresses or in different banks, respectively.

The number of bits of the unit data may be $3 \times 2^n$ (where n is a natural number) and the number of bits of the data bandwidth may be $2^m$ (where m is a natural number).

The first unit data and the second unit data may have different mipmap levels.

A mipmap level of the first unit data may be lower than a mipmap level of the second unit data.

According to an aspect of another embodiment, a cache memory includes a first bank and a cache controller configured to determine whether interleaving of data stored in the first bank is possible and when determined that interleaving of the data stored in the first bank is possible, storing first unit data of the data stored in the first bank in a first region of a first address of the first bank and storing part of second unit data of the data stored in the first bank in a second region of the first address of the first bank.

The cache memory may further include a second bank including a second address different from the first address.

The cache memory may further include storing remaining second unit data at the second address.

BRIEF DESCRIPTION OF THE DRAWINGS

FIG. 8B is a reference diagram for describing an example of a method of simultaneously storing images having different LODs in a cache memory.

DETAILED DESCRIPTION

Figure 1:
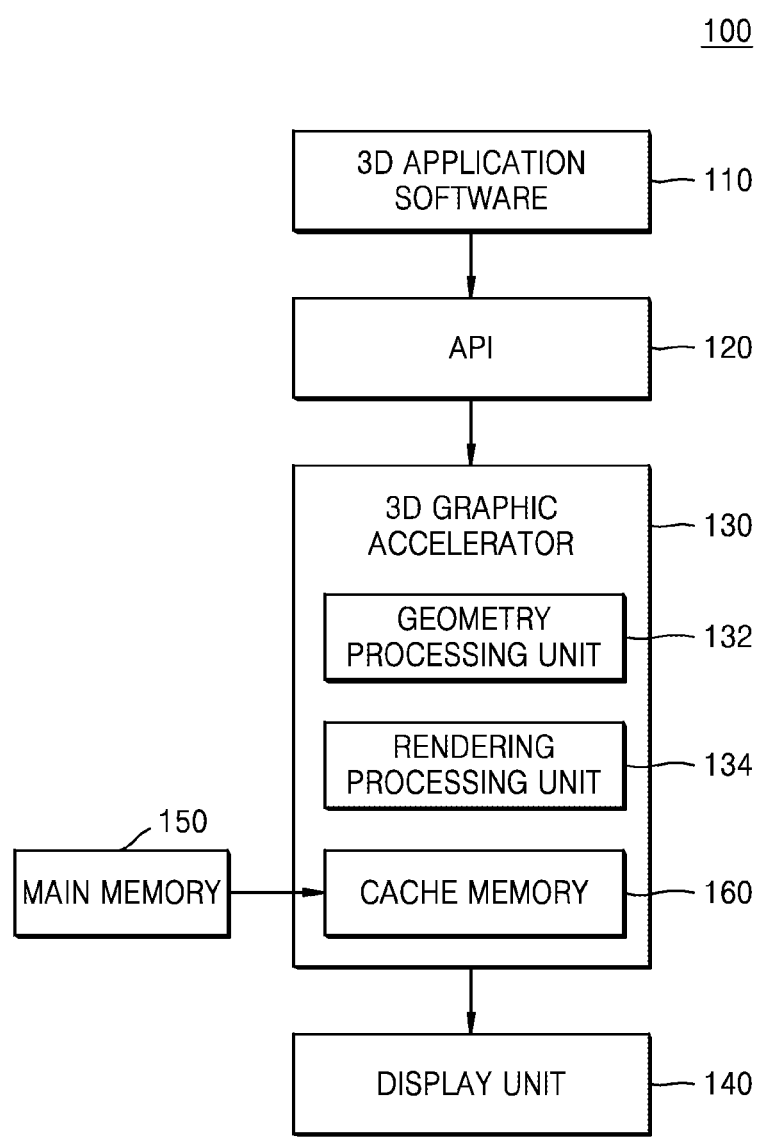
FIG. 1 is a block diagram illustrating an example of a graphic processor.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element is referred to as being "connected" to another element, it may be directly connected to the other element or may be indirectly connected to the other element with element(s) interposed therebetween. It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

It will also be understood that the terms "comprises", "includes", and "has", when used herein, specify the presence of stated elements, but do not preclude the presence or addition of other elements, unless otherwise defined.

It will be understood that, although the terms "first", "second", etc. may be used herein to describe various elements, these elements should not be limited by these terms. These terms are only used to distinguish one element from another.

FIG. 1 is a block diagram illustrating an example of a three-dimensional (3D) graphic processor.

As illustrated in FIG. 1, the 3D graphic processor 100 performs real-time hardware acceleration in a 3D graphic accelerator 130 with respect to 3D graphic data transmitted through an application programming interface (API) 120 by 3D application software 110, and outputs the resultant 3D graphic data to a display unit 140.

The 3D graphic accelerator 130 includes a geometry processing unit 132 and a rendering processing unit 134, but is not limited thereto and may include a cache memory 160 described below. The geometry processing unit 132 converts an object in a 3D coordinate system according to viewpoint thereof and performs projection onto a 2D coordinate system. The rendering processing unit 134 determines a color value or the like of an image of a 2D coordinate system and stores the color value or the like in a main memory 150. After completion of processing on all 3D data that are input with respect to a single frame, the color value or the like stored in the main memory 150 are displayed on the display unit 140. A calculation amount of the geometry processing unit 132 is proportional to the number of apexes of a polygon that is processed, and a calculation amount of the rendering processing unit 134 is proportional to the number of pixels that are generated.

Generally, a 3D graphic is configured by points, lines, or triangles, and the 3D rendering processing unit 134 has a configuration to process triangles at high speed. In order to obtain a more natural and softer image when a real-time scene is rendered in a 3D graphic application such as the 3D graphic accelerator 130, various textures and various color blending methods may be used. Hence, the rendering processing unit 134 frequently accesses the main memory 150, which greatly affects the improvement of performance of the 3D graphic accelerator 130. This is because latency is long when the 3D graphic accelerator 130 accesses the main memory 150. In order to prevent stall of the 3D graphic accelerator 130 from increasing, the 3D graphic processor 100 according to an example includes a cache memory 160.

Figure 2:
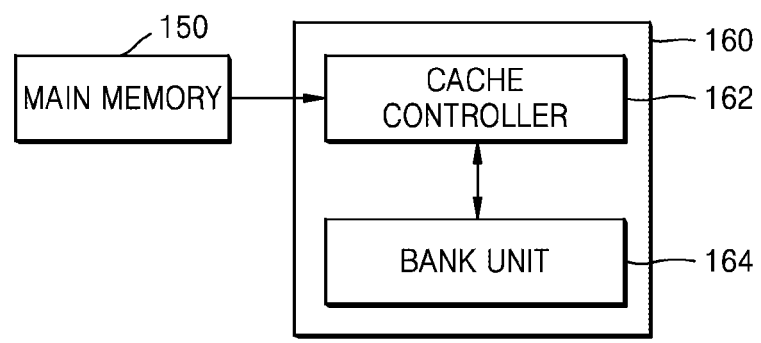
FIG. 2 is a block diagram illustrating an example of a cache memory.

FIG. 2 is a block diagram illustrating an example of the cache memory. The cache memory 160 of FIG. 2 may be a texture cache memory or a color cache memory. The main memory 150 may be a texture memory or a color memory. As illustrated in FIG. 2, the cache memory 160 includes a cache controller 162 and a bank unit 164. The bank unit 164 includes one or more banks. The cache controller 162 reads data from the main memory 150 and stores the read data in the bank unit 164. The data may be at least one selected from among texture data, color data, and sensitivity data. The texture data or the color data may include a plurality of cells. For example, the cell of the texture data may be referred to as texel. The cell of the color data may indicate R, G, and B sub-colors, or may indicate R, G, B, and W sub-colors. Hereinafter, a plurality of cells forming one piece of data will be referred to as unit data. For example, when the cells of the color data respectively correspond R, G, and B sub-colors, each of R, G, and B sub-colors is the cell and the sum of R, G, and B forms unit data.

The bank may include a plurality of bank cells arranged two-dimensionally. The bank cells may be two-dimensionally or three-dimensionally arranged in a matrix shape.

Figure 3:
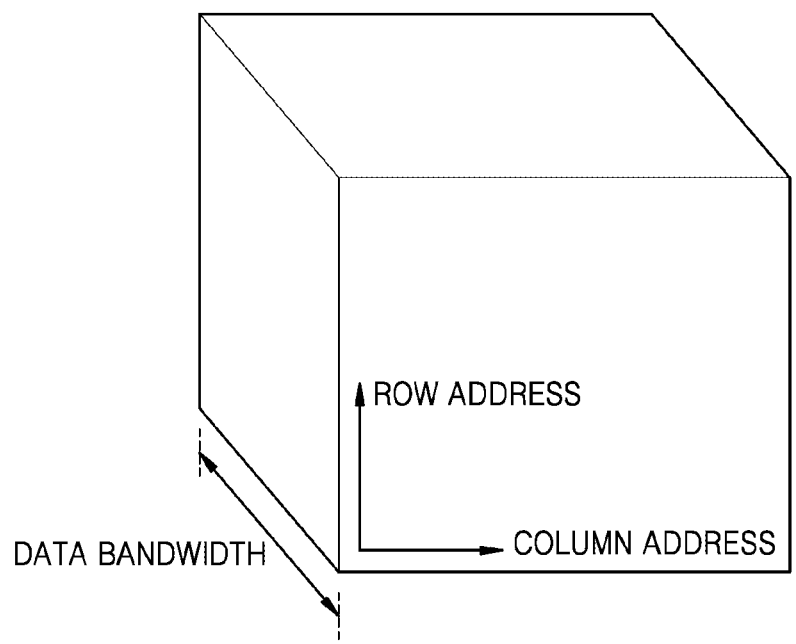
FIG. 3 is a schematic diagram illustrating an example of a configuration of a bank.

FIG. 3 is a schematic diagram illustrating an example of a configuration of a bank. As illustrated in FIG. 3, the bank includes a column address and a row address. The column address has a data bandwidth that is a space capable of storing data. Generally, a data bandwidth is a bit unit and may be $2^n$ bits (where n is a natural number). The column address, the row address, and the magnitude of the data bandwidth may be various according to the bank.

When data is stored in the bank, the cache controller 162 compares the number of bits of unit data read from the main memory 150 with the number of bits of the data bandwidth. The cache controller 162 uses a different data storing method according to the comparison result. For example, when the number of bits of the data bandwidth is an integer multiple of the number of bits of the unit data, the cache controller 162 sequentially stores unit data in the bank. For example, the column address and the row address are sequentially stored in this order.

Figure 4A:
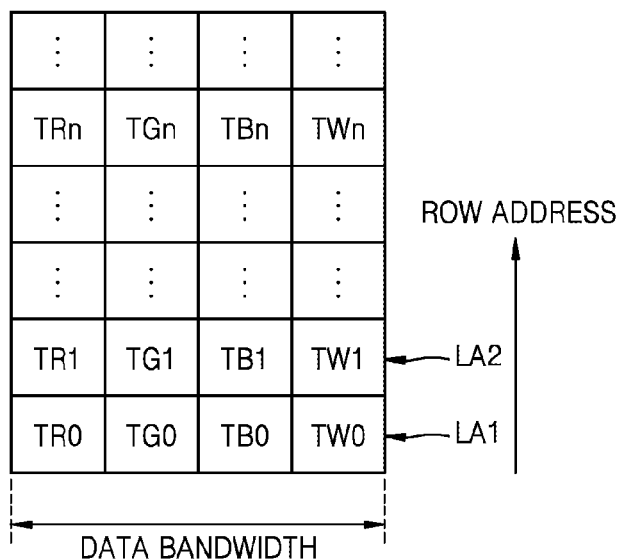
FIGS. 4A and 4B are reference diagrams for describing an example of a unit data storing method when the number of bits of a data bandwidth is an integer multiple of the number of bits of unit data.
Figure 4B:
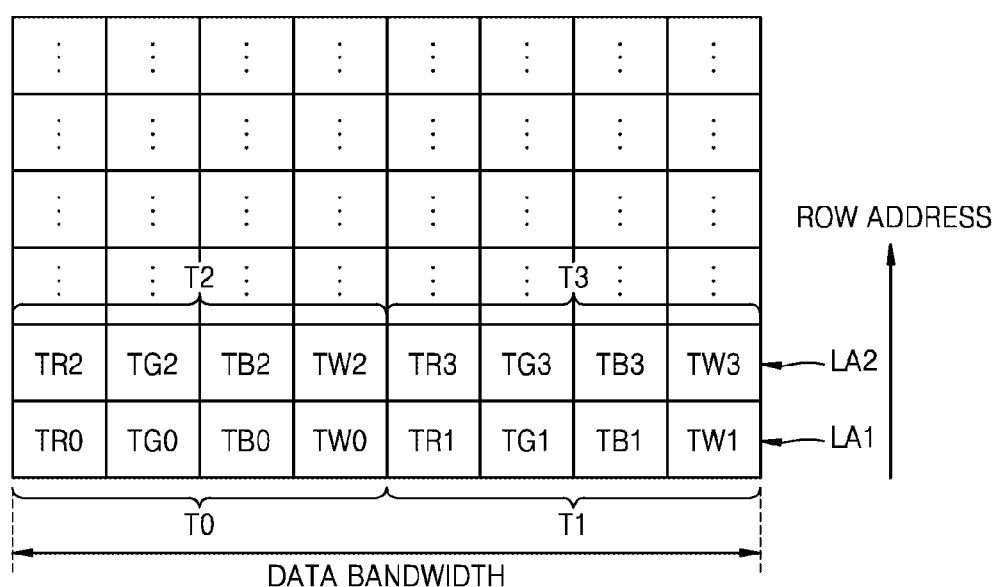

FIGS. 4A and 4B are reference diagrams illustrating an example for describing a unit data storing method when the number of bits of a data bandwidth is an integer multiple of the number of bits of unit data. As illustrated in FIG. 4A, when the unit data is 2-bit R, G, B, and W and the number of bits of the data bandwidth of the bank is 8 bits, the cache controller 162 sequentially stores the unit data, without dividing the unit data. For example, when the unit data is sequentially stored at a specific address and the address is fully filled, the cache controller 162 changes the address and sequentially stores the unit data. For example, when first unit data TR0, TG0, TB0, and TW0 are stored at a first row address LA1 and the first row address LA1 is fully filled, second unit data TR1, TG1, TB1, and TW1 are stored at a second row address LA2. In FIG. 4A, since the number of bits of the data bandwidth is equal to the number of bits of the unit data, one piece of unit data is stored at a single address.

Alternatively, as illustrated in FIG. 4B, when the unit data is 2-bit R, G, B, and W and the number of bits of the data bandwidth of the bank is 16 bits, the cache controller 162 may store data by allocating two unit data to a single row address. For example, when two unit data T0 and T1 are stored at a first row address LA1 and the first row address LA1 is fully filled, two unit data T2 and T3 may be stored at a second row address LA2.

For convenience, a bank having a single column address and a plurality of row addresses is illustrated in FIGS. 4A and 4B, but the example is not limited thereto. The bank may have a plurality of column addresses. When the column address included in the same row address is fully filled, the cache controller 162 changes the row address and sequentially stores data at a column address of a changed row address.

On the other hand, the number of bits of the data bandwidth may not be an integer multiple of the number of bits of the unit data. In such a case, the cache controller 162 may interleave data in the bank. That is, the cache controller 162 stores first unit data, among the unit data, in a region of a first address of the bank and stores part of second unit data in an extra region of the first address. The cache controller 162 divides the unit data on a cell basis. When the data is texture data, the cache controller 162 divides the data on a texel basis. Alternatively, when the data is color data, the cache controller 162 divides the data on a sub-color basis (for example, R, G, and B).

Figure 5:
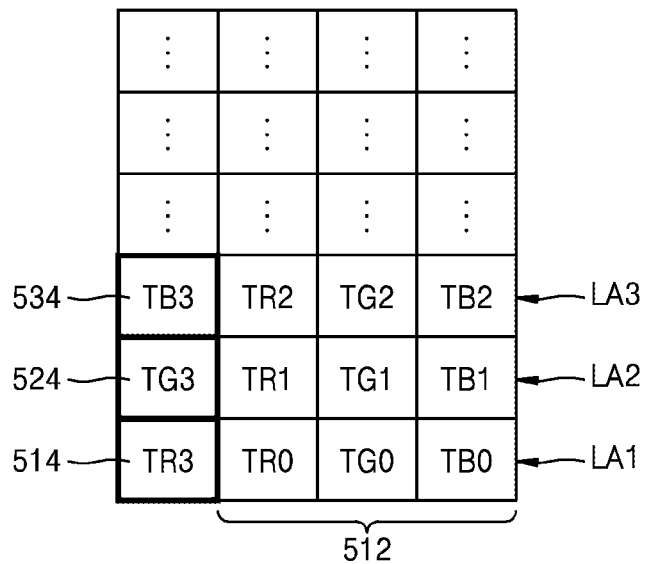
FIG. 5 is a reference diagram describing an example of a data storing method when the number of bits of unit data is not an integer multiple of the number of bits of a data bandwidth.

FIG. 5 is a reference diagram illustrating an example for describing a data storing method when the number of bits of a data bandwidth is not an integer multiple of the number of bits of unit data. For example, the number of bits of the unit data may be $3 \times 2^n$ (where n is a natural number) and the number of bits of the data bandwidth of the bank may be $2^m$ (where m is a natural number). For convenience of description, it is assumed that the number of bits of the unit data is 24 bits. That is, the unit data is 8-bit R, G, and B. Also, it is assumed that the data bandwidth of the bank is 32 bits. In addition, it is assumed that the bank has a single column address and a plurality of row addresses.

The cache controller 162 stores first unit data TR0, TG0, and TB0 in a region 512 of a first address LA1. Since the first unit data is 24 bits, only 24 bits of the data bandwidth of the first address are filled and the other 8 bits are left. The cache controller 162 changes the row address and stores second unit data TR1, TG1, and TB1 at a second row address LA2. In addition, the cache controller 162 changes the row address and stores third unit data TR2 TG2, and TB2 at a third row address LA3.

The cache controller 162 divides fourth unit data TR3, TG3, and TB3 into a plurality of cells and stores cells of the fourth unit data TR3, TG3, and TB3 in extra regions 514, 524, and 534 of the first to third row addresses. As described above, when the number of bits of the data bandwidth of the bank is not the integer multiple of the number of bits of the unit data, part of the unit data is interleaved in the extra region of the bank, thus improving the space utilization of the bank. Therefore, more data may be stored in a small storage space.

In FIG. 5, the bank in which the single column address is assigned to the single row address has been described. This is only for convenience of description and the exemplary embodiment is not limited thereto. That is, the bank may have a single row address and a plurality of column addresses. In such a case, the unit data may be sequentially stored on a column address basis, and part of the unit data may be interleaved in the extra regions of the column addresses.

Figure 6:
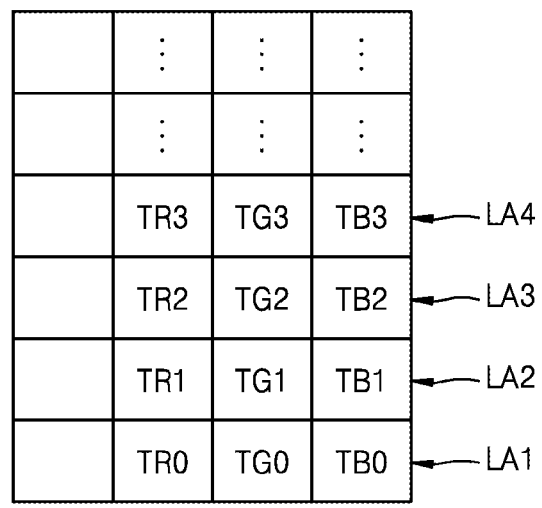
FIG. 6 is a reference diagram for describing a data storing method when the number of bits of unit data is not an integer multiple of the number of bits of a data bandwidth, according to a comparative example.

FIG. 6 is a reference diagram for describing a data storing method when the number of bits of a data bandwidth is not an integer multiple of the number of bits of unit data, according to comparative example. According to the comparative example, when the number of bits of the data bandwidth is not the integer multiple of the number of bits of the unit data, the data is not interleaved. For example, as illustrated in FIG. 6, when the unit data is 24 bits and the data bandwidth of the bank is 32 bits, the cache controller 162 according to comparative example sequentially stores the unit data, without interleaving the unit data. The cache controller 162 stores first unit data TR0, TG0, and TB0 at a first row address LA1, stores second unit data TR1, TG1, and TB1 at a second row address LA2, stores third unit data TR2, TG2, and TB2 at a third row address LA3, and stores fourth unit data TR3, TG3, and TB3 at a fourth row address LA4.

When comparing the bank of FIG. 5 that stores data with interleaving and the bank of FIG. 6 that stores data without interleaving, it can be seen that, even when the same data is stored, the storage space of the bank of FIG. 5 is reduced by ¼ times than the storage space of the bank of FIG. 6. In addition, the method of storing the data with interleaving may increase the utilization of the storage space. Furthermore, the data reading performance may also be improved.

For example, when the data is read from the bank of FIG. 5, the cache controller 162 reads the first to fourth unit data by only three-time accesses. However, when the data is read from the bank of FIG. 6, the cache controller 162 needs to access the bank four times so as to read the first to fourth unit data. Therefore, it can be seen that the method of storing the data with interleaving increases the utilization of the storage space and the data reading performance.

Figure 7A:
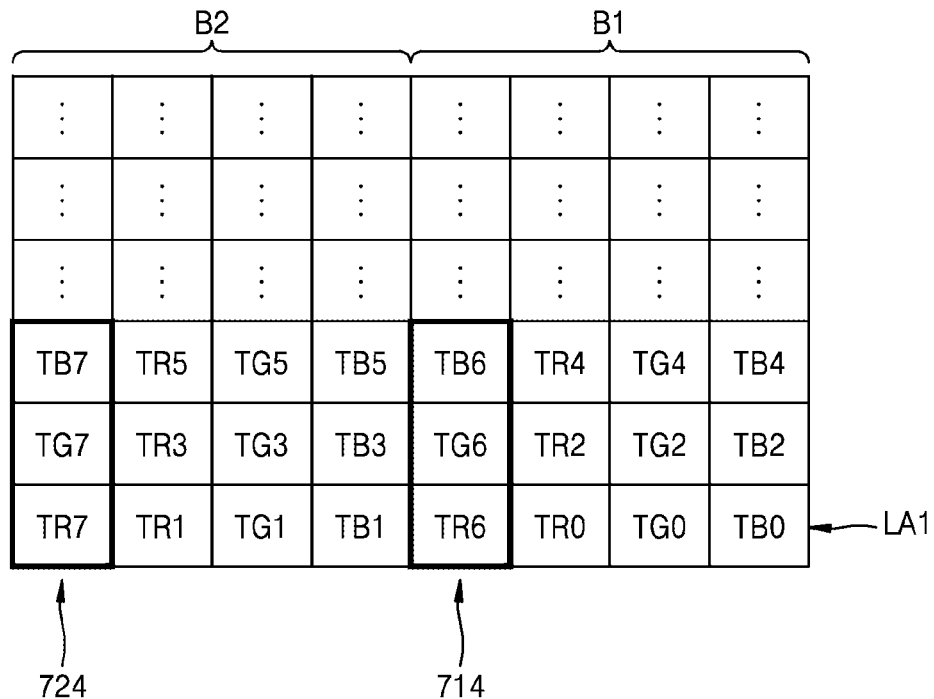
FIGS. 7A to 7C are reference diagrams for describing an example of a method of interleaving data in a plurality of banks.
Figure 7B:
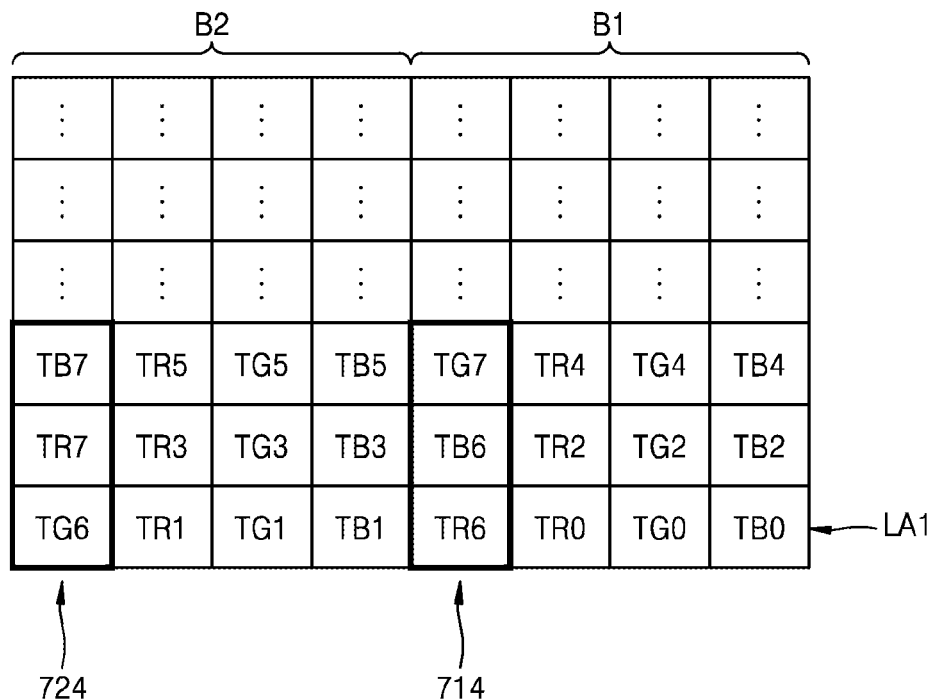
Figures 7C, 8A:
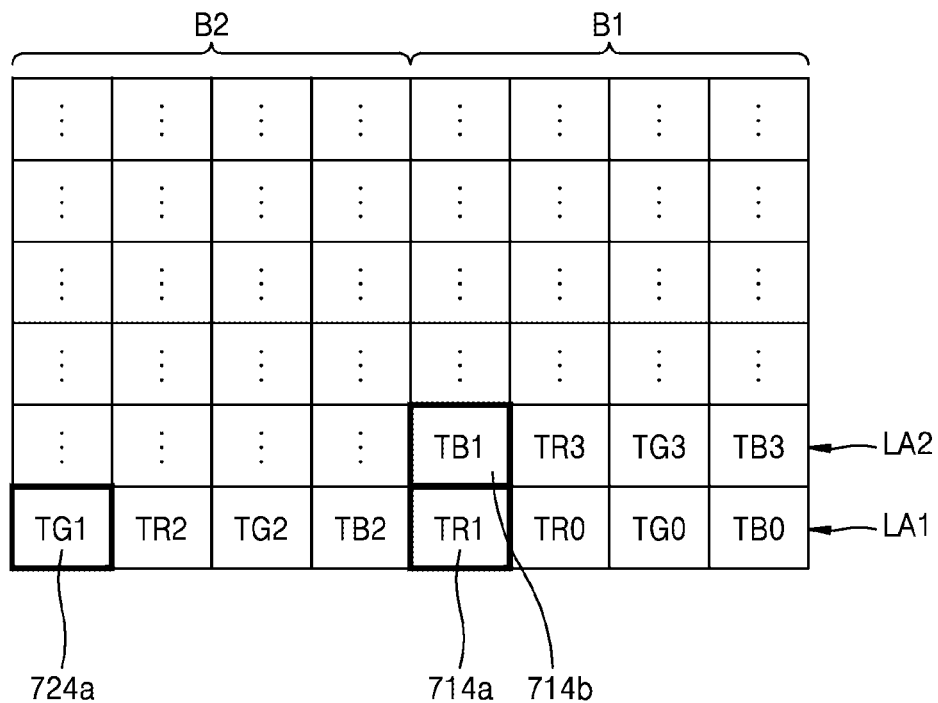
FIG. 8A is a diagram illustrating an example of texture images with respect to two levels of details (LODs)

FIGS. 7A to 7C are reference diagrams for describing an example of a method of interleaving data in a plurality of banks. The cache memory 160 includes a plurality of banks. The cache controller 162 stores unit data in parallel in the plurality of banks. For example, the cache controller 162 stores first unit data TR0, TG0, and TB0 at a first row address LA1 of a first bank B1 and then stores second unit data TR1, TG1, and TB1 at a first row address LA1 of a second bank B2. The cache controller 162 stores third to sixth unit data while alternatively moving to the first bank B1 and the second bank B2.

Cells TR6, TG6, and TB6 of seventh unit data are stored in extra regions 714 of the first bank B1 one by one, and cells TR7, TG7, and TB7 of eighth unit data are stored in extra regions 724 of the second bank B2 one by one.

Alternatively, as illustrated in FIG. 7B, the cache controller 162 stores the cells TR6, TG6, TB6, TR7, TG7, and TB7 of the seventh and eighth unit data in the extra regions 714 and 724 of the first and second banks B1 and B2 while alternatively moving to the first bank B1 and the second bank B2.

In addition, as illustrated in FIG. 7C, the cache controller 162 stores the first unit data TR0, TG0, and TB0 at the first row address LA1 of the first bank B1 and stores the first cell TR1 of the second unit data in the extra region 714a of the first row address LA1 of the first bank B1. The cache controller 162 stores the third unit data TR2, TG2, and TB2 at the first row address LA1 of the second bank B2 and stores the second cell TG1 of the second unit data in the extra region 724a of the first row address LA1 of the second bank B2. In addition, the cache controller 162 stores the fourth unit data TR3, TG3, and TB3 at the second row address LA2 of the first bank B1 and stores the third cell TB1 of the second unit data in the extra region 714b of the second row address LA2 of the first bank B1. In this way, the data is interleaved in the extra regions of the banks.

The method of storing the data in different addresses of the banks while dividing the cells of the unit data is advantageous when the data stored in a mipmap format is stored and read.

In the 3D computer graphic, modeling data having 3D coordinates may be generated based on information on viewpoint, and texture mapping refers to a method by which an object abstracted with fewer polygons is made to have a more elaborate and realistic expression by adding a 3D object to a 2D texture. In the texture mapping fields, the mipmap is a set of bitmap images including a basic texture and textures obtained by continuously reducing the basic texture in advance so as to improve a rendering speed and is a pre-filtered version of a texture image so as to obtain a specific resolution or level of detail (LOD). A mipmap level may be allocated to each bitmap image. For example, a basic texture image may be defined as a reference level (level 0), and a texture image having ¼ times the size of the 0-level texture image may be defined as a 1-level texture image. In addition, a texture image having ¼ times the size of the 1-level texture image may be defined as a 2-level texture image. That is, the mipmap level may be defined in such a manner that the size of the texture image is reduced as the level is increased with reference to the basic texture image. Therefore, as the mipmap level is increased, the resolution of the texture image is reduced.

FIG. 8A is a diagram illustrating an example of a texture image with respect to two LODs. An LOD0 mipmap is an image having sixteen unit data, and an LOD1 mipmap is an image having four unit data. The cache memory 160 according to an example simultaneously stores or reads images having different LODs, but is not limited thereto and thus the cache memory 160 may alternately store and read images having different LODs.

Figure 8B:
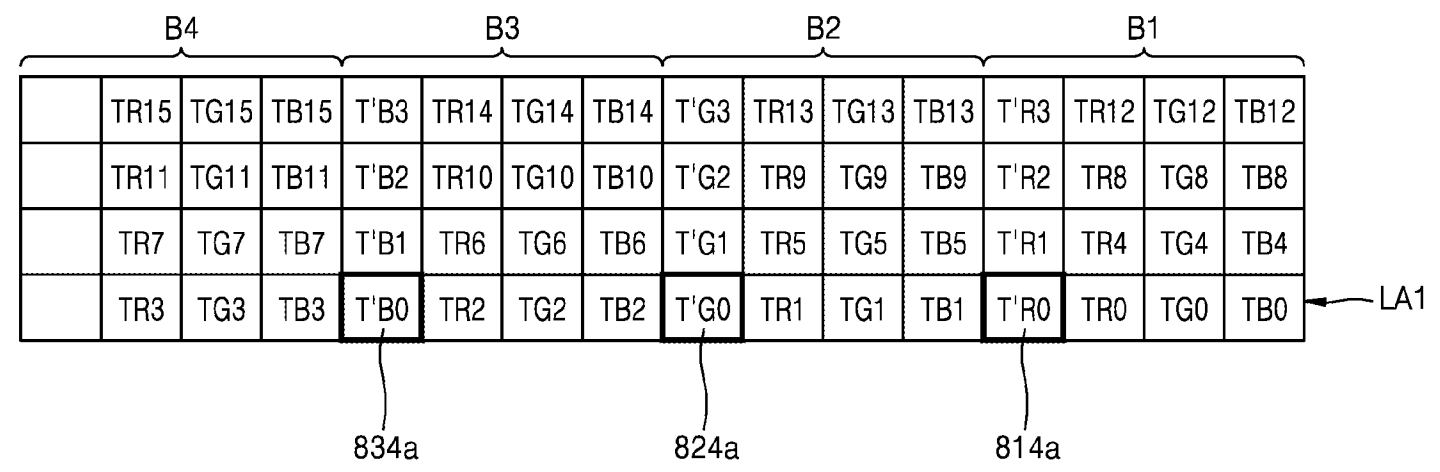

FIG. 8B is a reference diagram describing an example of a method of simultaneously storing images having different LODs in the cache memory. For convenience, it is assumed that the cache memory 160 includes four banks each having a single column address and four row addresses.

The cache controller 162 stores first unit data TR0, TG0, and TB0 of the LOD0 image at a first row address LA1 of a first bank B1, stores second unit data TR1, TG1, and TB1 of the LOD0 image at a first row address LA1 of the second bank B2, stores third unit data TR2, TG2, and TB2 of the LOD0 image at a first row address LA1 of a third bank B3, and stores fourth unit data TR3, TG3, and TB3 of the LOD0 image at a first row address LA1 of the fourth bank B4. In this way, the cache controller 162 sequentially stores the unit data of the LOD0 image in the first to fourth banks B1, B2, B3, and B4.

In addition, the cache controller 162 stores a first cell T'R0 of the first unit data of the LOD1 image in an extra region 814a of the row address LA1 of the first bank B1, stores a second cell T'G0 of the first unit data of the LOD1 image in an extra region 824a of the first row address LA1 of the second bank B2, and stores a third cell T'B0 of the first unit data of the LOD1 image in an extra region 834a of the first row address LA1 of the third bank B3. In this way, the cache controller 162 sequentially stores the cells T'R0, T'G0, and T'B0 of the first unit data of the LOD1 image at the first row addresses of the first to third banks B1, B2, and B3. However, it is noted that this feature is not limited thereto and the cache controller 162 may store the cells, T'RO, T'GO and T'BO of the first unit data simultaneously.

Similarly, the cache controller 162 sequentially stores the unit data of the LOD0 image in the first to fourth banks B1, B2, B3, and B4, and sequentially stores the cells of the unit data of the LOD1 image in the extra regions of the first to fourth banks B1, B2, B3, and B4. However, this process is not limited thereto and the cache controller 162 may also store the cells of the unit data of the LOD1 image simultaneously.

Since the data having different levels are stored at the single address, it is possible to reduce the storage space and simultaneously read data having different levels even when the cache controller 162 reads data. In FIG. 8B, the extra region of the fourth bank B4 is illustrated as being empty, but it is obvious that an arbitrary cell of the LOD1 image may be stored. The cell of the unit data stored in the fourth bank B4 may be any one selected from the cells of the unit data stored in the first to third banks B1, B2, and B3, and may be unit data different from the unit data stored in the first to third banks B1, B2, and B3.

Figure 9:
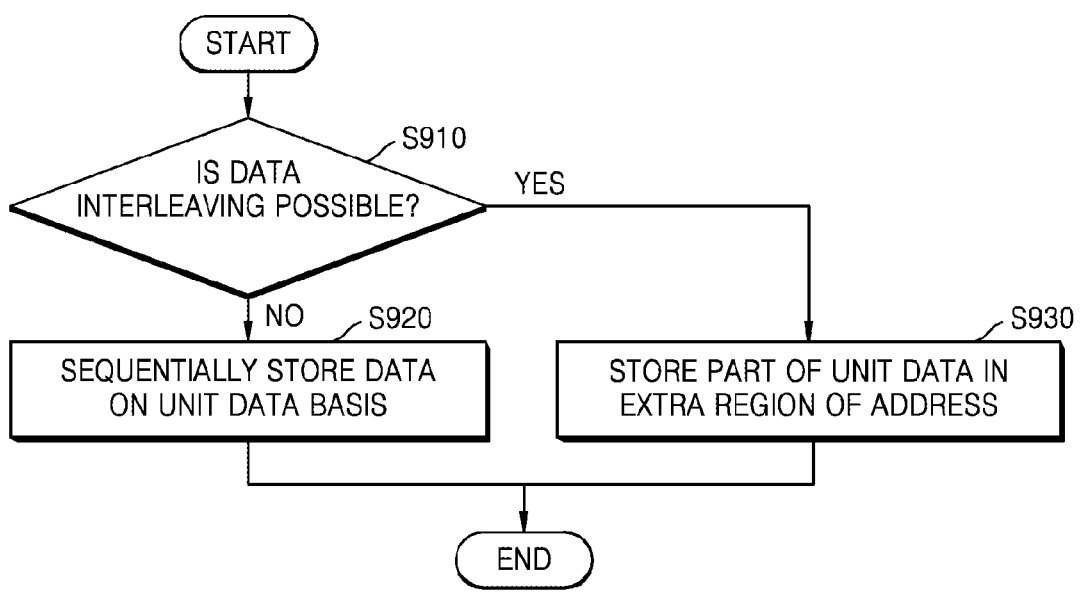
FIG. 9 is a flowchart of an example of a method of managing a cache memory.

FIG. 9 is a flowchart of an example of a method of managing a cache memory.

In operation S910, the cache controller 162 determines whether data interleaving is possible in a bank.

In operation S920, when it is determined that the data interleaving is not possible in the bank, the cache controller 162 sequentially stores the data in the bank on a unit data basis. When the number of bits of a data bandwidth of the bank is N times the number of bits of unit data included in the data, the cache controller 162 determines that the data interleaving is not possible. This is because N unit data can be stored at the address, and therefore, no extra region occurs at the address of the bank. Thus, the cache controller 162 stores the data on a unit data basis, without dividing the unit data. The cache controller 162 stores the unit data in the order of a column address and a row address, but is not limited thereto and thus the cache controller 162 may store the unit data in the order of the row address and the column address. When a plurality of banks are present, the cache controller 162 stores the unit data in the plurality of banks in a parallel manner. For example, after storing the data at a first row address of a first bank B1 and storing the data at a first row address of a second bank B2, the data is stored by changing the row address.

In operation S930, when it is determined that the data interleaving is possible in the bank, the cache controller 162 stores part of the unit data in an extra region of the address. When the number of bits of the data bandwidth of the bank is not an integer multiple of the number of bits of the unit data of the data to be stored, the data bandwidth of the bank is filled with the unit data. Therefore, the cache controller 162 divides the unit data into a plurality of cells and stores part of the unit data, that is, cells, in the extra region of the bank. Since the method of storing part of the unit data in the extra region of the bank has been described above, a detailed description thereof will be omitted.

As described above, since the data is stored with interleaving, it is possible to reduce the storage space of the bank and improve the reading performance when the data stored in the bank is read.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of managing a cache memory, the method comprising:
   determining whether a number of bits of a data bandwidth stored in a bank is an integer multiple of a number of bits of unit data in data to be stored;
   storing first unit data, among the data to be stored, in a first region of a first address in the bank in response to the number of bits of the data bandwidth not being the integer multiple of the number of bits of the unit data, the first address corresponding to only the first region and a second region, the first region being the same size as the first unit data;
   storing part of second unit data, among the data to be stored, in the second region of the first address, the second region being the same size as the part of second unit data, wherein the number of bits of the unit data is $3 \times 2^n$, where n is a natural number and the number of bits of the data bandwidth is $2^m$, where m is a natural number; and
   storing remaining second unit data at a second address different from the first address.

2. The method of claim 1, wherein the remaining second unit data stored at the second address is stored in a same bank as the first unit data stored at the first address and the second address is different from the first address in either a column address or a row address.

3. The method of claim 1, wherein the remaining second unit data stored at the second address is stored in a bank different from the bank where the first unit data having the first address is stored.

4. The method of claim 3, wherein the remaining second unit data stored at the second address has a same row address as the bank different from the bank where the first address is stored.

5. The method of claim 1, wherein, when the remaining second unit data includes cells, the cells are respectively stored at different addresses or in different banks.

6. The method of claim 1, wherein the data to be stored is at least one selected from among texture data, pixel data, and sensitivity data.

7. The method of claim 1, wherein the first unit data and the second unit data have different mipmap levels.

8. The method of claim 1, wherein a mipmap level of the first unit data is lower than a mipmap level of the second unit data.

9. The method of claim 1, further comprising sequentially storing the data to be stored in the bank on a unit data basis in response to the number of bits of the data bandwidth being the integer multiple of the number of bits of the unit data.

10. A cache memory comprising:
    a bank; and
    a cache controller configured to store data read from a main memory in the bank,
    wherein, in response to a number of bits of a data bandwidth in the bank not being an integer multiple of a number of bits of unit data in the read data, the cache controller stores first unit data, among the read data, in a first region of a first address stored in the bank, the first address corresponding to only a first region and a second region, the first region being the same size as the first unit data, and stores part of second unit data, among the read data, in the second region at the first address, the second region being the same size as the part of second unit data, wherein the number of bits of the unit data is $3 \times 2^n$, where n is a natural number, and the number of bits of the data bandwidth is $2^m$, where m is a natural number, wherein the cache controller stores remaining second unit data at a second address different from the first address.

11. The cache memory of claim 10, wherein the remaining second unit data stored at the second address is stored in a same bank as the first unit data stored at the first address and the second address is different from the first address in either a column address or a row address.

12. The cache memory of claim 10, wherein the remaining second unit data stored at the second address is stored in a bank different from the bank where the first unit data having the first address is stored.

13. The cache memory of claim 12, wherein the remaining second unit data stored at the second address has a same row address as the bank different from the bank where the first address is stored.

14. The cache memory of claim 10, wherein, when the remaining second unit data includes cells, the cache controller stores the cells at different addresses or in different banks, respectively.

15. The cache memory of claim 10, wherein the first unit data and the second unit data have different mipmap levels.

16. The cache memory of claim 10, wherein a mipmap level of the first unit data is lower than a mipmap level of the second unit data.

* * * * *